May 16, 1961 R. A. DIBLEY ET AL 2,984,190
VALVE CONSTRUCTION
Filed Oct. 14, 1955

INVENTORS
RAYMOND A. DIBLEY
DONALD R. DIBLEY
BY
Jay C. Taylor
ATTORNEY

United States Patent Office 2,984,190
Patented May 16, 1961

2,984,190

VALVE CONSTRUCTION

Raymond A. Dibley and Donald R. Dibley, both of 5555 Conner Ave., Detroit, Mich.

Filed Oct. 14, 1955, Ser. No. 540,557

10 Claims. (Cl. 103—178)

This invention relates to improvements in a plunger type valve and in particular to an improved piston and valve assembly suitable for use in checks, and the like. Although the present invention is illustrated herein in application with an air pump, it will be apparent from the following that the piston and valve assembly described are readily adapted for use in other applications and with other fluids, as for example in hydraulic pumps and circuits.

An object of the invention is to provide an improved valve construction adapted to comprise an element of a piston assembly in an air pump, by way of example, whereby an annular valve element of flexible compressible material is firmly secured to a plunger reciprocable in the pump barrel or cylinder and is in sliding engagement with the latter's interior walls so as to hold the plunger substantially in coaxial alignment within said cylinder.

Another object is to provide a valve construction which positively avoids metal-to-metal contact between the pump cylinder and elements of the piston assembly, thereby to minimize wearing of the latter and noise or rattling of the pump.

Other objects are to provide an improved valve construction which is particularly efficient in operation, yet which is readily and economically manufactured by mass production methods, as for example entirely by stamping, drawing, or swaging operations, and to provide an improved economical method for manufacturing such a valve construction wherein the aforesaid flexible valve element is feasibly die-cut from sheet material without recourse to a molding process.

Still another object is to provide an improved piston and plunger combination which avoids cocking of the piston out of coaxial alignment with the pump cylinder, particularly at the upper limit of movement of the plunger when the latter is at maximum withdrawal from the cylinder.

Other objects of this invention will appear in the following description and appended claims, reference being had to the accompanying drawings forming a part of this specification wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
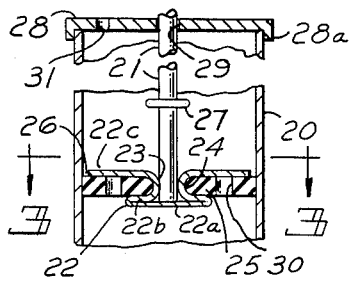
Fig. 1 is a fragmentary axial mid-section through a plunger valve embodying the present invention, illustrating the position of the valve element in the closed position during downward movement of the plunger.
Figure 2:
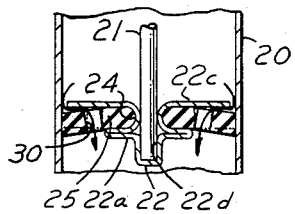
Fig. 2 is a view similar to Fig. 1, illustrating a modification of the invention, the valve element being shown in the open position during upward movement of the plunger.
Figure 3:
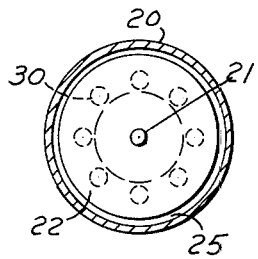
Fig. 3 is a transverse section taken in the direction of the arrows along the line 3—3 of Fig. 1.

Referring to Figs. 1 through 3, two valve mechanisms are illustrated by way of example which are particularly suitable for use with a manually operated air pump having a barrel or cylinder 20 and a piston secured to the lower end of a plunger 21 reciprocable axially in the cylinder 20. The piston comprises an annular cup-like retainer 22 having the same section along any diameter and formed from suitable rigid sheet material, such as sheet metal, to provide a central hub or socket portion 23 having the lower end of the plunger 21 firmly secured therein, as for example by being forced tightly therein to complete a pressed fit or by being welded or brazed therein.

In Fig. 1, the circular base 22a of the socket portion 23 extends radially appreciably beyond the plunger 21 for a distance approximately equal to one half the internal radius of the cylinder 20, then upwardly and inwardly at an annular reverse fold 22b, closely overlying the base 22a. Adjacent the plunger 21, the retainer 22 loops upwardly and outwardly to provide an annular backing flange or plate 22c spaced from the portion 22b by an annular channel 24. The structure of the retainer 22 in Fig. 2 is the same as in Fig. 1, except that the base 22a is drawn downwardly at 22d, so as to deepen the socket portion 23 having the lower end of plunger 21 snugly seated therein.

In Figs. 1 and 2, the inner circumferential portion of an annular flexible valve element or disc 25 is seated snugly within the channel 24 and solidly against the latter's base to complete a fluid tight seal thereat, the outer circumference of the valve disc 25 being seated snugly against the inner wall of the cylinder 20 also to complete a fluid tight seal thereat particularly when the piston is in the down stroke. The upper backing plate or flange 22c closely overlies the disc 25 as illustrated and extends substantially to the wall of the cylinder 20 to comprise a rigid upper support or backing for the disc 25 and to hold the latter in substantially the shape illustrated in Fig. 1 during the piston's downward stroke.

By virtue of the snug fit of the valve disc 25 within the channel 24 which prevents relative radial play or movement between the disc 25 and retainer 22, in cooperation with the small annular space or clearance 26 between the outer circumference of the backing flange 22c and the sidewall of the cylinder 20, metal-to-metal contact between the retainer and cylinder is avoided and wearing of the latter is minimized. Also in the above regard, an annular stop or enlargement 27 is swaged on the plunger 21 at a location spaced above the piston so as to engage the underside of the upper cap 28 of the pump barrel and to limit the upward stroke of the plunger 21. Above the stop 27 the plunger 21 is slidable axially through a central hole 29 in the cap 28, which serves to center the plunger 21 in the cylinder 20 and to facilitate manual operation of the pump by preventing cocking of the plunger at the limit of its upper movement within the cylinder. The cap 28 is suitably secured in position in the present instance by an integral depending flange 28a secured on the end of the cylinder 20.

In order to effect a valve action, the disc 25 is provided with a plurality of circumferentially spaced air passages or openings 30, Fig. 3, located in the portion of the disc 25 which extends radially beyond the base 22a and which is covered by the backing flange 22c. Upon downward movement of the plunger 21, air pressure below or in advance of the disc 25 urges the latter upwardly snugly against the overlying flange 22c, Fig. 1, thereby to block air passage through the openings 30 and around the disc 25 between the latter and the cylinder 20. A suitable vent is employed at the lower end of the cylinder for discharging air under pressure. An air inlet opening 31 in the cap 28 prevents formation of a vacuum above the piston during the downward or pumping stroke.

During the return or upward stroke, the outer periphery of the disc 25 frictionally drags on the adjacent wall of the cylinder 20 and is thus pulled downwardly and away from the backing flange 22c, enabling passage of air downwardly through the openings 30 and around the periphery of the flange 22c as indicated by the arrow, Fig. 2.

The valve element 25 in the present instance comprises a thin flat disc of suitably yieldable material impervious to air and adapted to provide the aforesaid fluid tight seal with the retainer 22 and cylinder 20 when the piston is in the downward stroke. The material of the disc 25 should be sufficiently flexible to enable the aforesaid valve action and should also have sufficient body or resistance to compression or extrusion to prevent undue deformation of its outer periphery into the annular space 26 to the extent that the fluid seal is broken during the pumping stroke. Plastic materials of the foregoing character or rubber or rubber-like materials such as neoprene which are resiliently compressible or deformable under pressure and which tend to return to their undeformed shape when the pressure is released are preferred. By virtue of the structure described the disc 25 is simply die-cut from sheet material and assembled with the retainer 22. An economical construction is thus permitted and the expense of molding the disc 25 is avoided.

Figure 4:
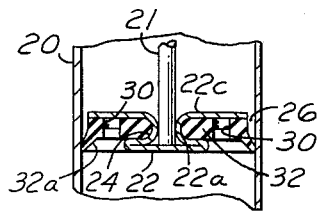
Fig. 4 is a view similar to Fig. 1 illustrating another modification of the present invention.

In general the remarks above relating to the materials, structure, and operation of the valve and pump illustrated in Figs. 1 through 3 also apply to the valve and pump devices illustrated in Figs. 4 through 12, with the exceptions noted below. In Fig. 4 a molded valve element or disc 32 is illustrated comprising a flexible material of the character aforesaid, preferably a resiliently yieldable or compressible rubber or rubber-like or plastic material. In this instance the disc 32 is formed with an integral depending outer annular lip or flap 32a engaging the barrel or cylinder 20 at a fluid tight seal. Inwardly of the lip 32a, the disc 32 is the same as the disc 25 and is similarly assembled with the retainer 22. During the downward or pressure stroke of plunger 21, the disc 32 is forced upwardly against the backing flange 22c to effect the aforesaid sealing action. On the upward stroke, the flange 32a frictionally drags along the cylinder 20 and the portion of the disc 32 outwardly of the base 22a yields downwardly to enable downward passage of air through the holes 30.

Figure 5:
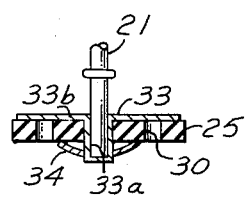
Figs. 5 through 10 are views similar to Fig. 1, each illustrating a different modification of the present invention, the piston and plunger assembly being removed from the pump cylinder.

In Figs. 5 through 12 the pistons described below are illustrated with the cylinder 20 removed. It is to be understood that the outer circumference of the flexible valve element in each instance rides in sealing engagement along the interior wall of the cylinder as described above. In Fig. 5 a disc 25 is employed with a modified annular cup-shaped retainer 33 having a hub or socket portion 33a containing the lower end of the plunger 21 firmly secured therein. An upper annular backing plate or flange 33b similar to the flange 22c extends radially and integrally from the upper edge of the socket portion 33a and overlies the disc 25 for the purpose aforesaid. An annular upwardly dished spring clip or washer 34 is forced over the lower end of the socket portion 33a. The outer periphery of the washer 34 engages the underside of the disc 25 annularly at locations inwardly of the holes 30 to hold the inner portions of the disc 25 snugly against the upper retaining flange 33b and complete an air tight seal therewith. By virtue of the compressibility of the disc 25, the outer edge of the washer 34 embeds into the disc 25 when forced snugly thereagainst and positively prevents displacement of the latter from around the hub portion 33a. In Figs. 4 and 5, the valve discs shown seat solidly against the base of the channel 24, as in Fig. 4, or against the exterior of the socket portion 33a as in Fig. 5, and the outer circumferences of the flanges 22c and 33b terminate short of the outer circumferences of their valve discs so as to avoid the possibility of metal-to-metal contact and undue wear of the cylinder 20.

Figure 6:
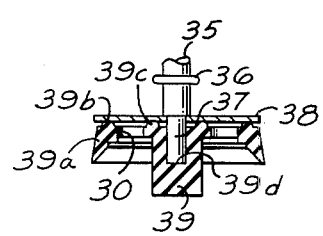

In Fig. 6 a modified plunger 35 is illustrated having an annular enlargement 36 similar to the enlargement 27 and having a lower end 37 of reduced diameter spaced below the enlargement 36 and extending through a thin annular backing plate 38 of rigid material such as sheet steel, which closely confines the reduced extension 37 and seats against the annular shoulder at the upper end of the latter reduced extension. Below the plate 38, the extension 37 seats snugly into a socket 39d of a hub or body 39 of the above described resiliently yieldable molded valve material and is suitably secured therein either by friction or cement.

Underlying the plate 38 and extending radially from the upper edge of the body 39 is an integral annular valve disc or element 39a having the circumferentially spaced holes 30 for the purpose aforesaid. In this instance a pair of upper annular coaxial beads 39b and 39c spaced by the holes 30 are effective to enhance the fluid seal against the underside of the plate 38. On the upstroke, the outer peripheral portions of the valve disc 39a drag against the sidewall of the cylinder 20 as aforesaid so as to pull the annular bead 39b downwardly and enable downward passage of air through the openings 30 and between the top of the bead 39b and the underside of the plate 38.

As illustrated, the vertical thickness of the disc 39a intermediate the holes 30 is reduced to enhance the valve action. The thickened hub or body 39 comprises a shock absorbing element or bumper adapted to engage the bottom of the cylinder 30. For this reason a molded valve element of resiliently yieldable rubber or rubber-like material is preferred. Also the cup portion 39d snugly engages the extension 37 to prevent radial play therebetween and to avoid metal-to-metal contact as aforesaid.

Figure 7:
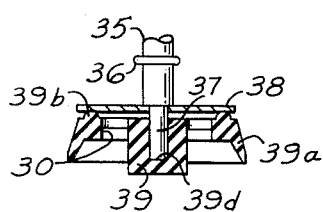

The structure illustrated in Fig. 7 is substantially the same as illustrated in Fig. 6 except that the inner bead 39c is not employed. In this instance the plate 38 and a plunger 35 are preferably integral to assure a fluid seal around the extension 37 at its juncture with the plate 38.

Figure 8:
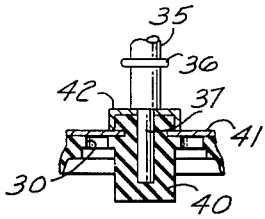

In Fig. 8 the reduced extension 37 is somewhat longer than in Figs. 6 and 7 and extends snugly into a body 40 of the resiliently yieldable valve material. An annular backing plate 41 similar to the plate 38, instead of fitting snugly around the extension 37 and resting on top of the body 40, seats within a radially opening annular channel in the body at a location below its top. An inverted annular cup 42 overlies the top of body 40 and seats against the shoulder at the top of the reduced extension 37. The depending annular sides of the cup 42 seat against the top of the plate 41 to provide a positive support at an annular location spaced radially from the extension 37. In other respects, the valve action of the device illustrated in Fig. 8 is the same as described above.

Figure 9:
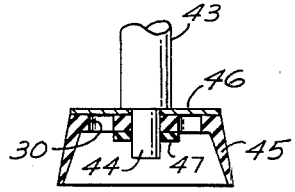

In Fig. 9, a plunger 43 is provided with a lower reduced portion 44 extending snugly and centrally through a valve disc 45 of the aforesaid molded valve material and containing the circumferentially spaced holes 30 for the purpose aforesaid. An annular backing plate 46 overlying the upper surface of the disc 45 and underlying the shoulder at the upper end of the extension 44 cooperates with the valve disc 45 to accomplish the above described valve action. A retaining washer 47 having a pressed fit on the lower extension 44 underlies a central portion of the valve disc 45 and holds the latter firmly upwardly against the plate 46 to complete a fluid tight seal therewith.

Figure 10:
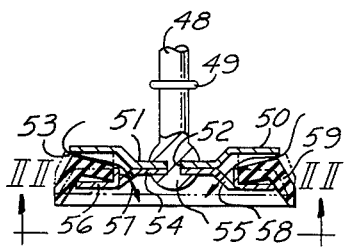
Figure 11:
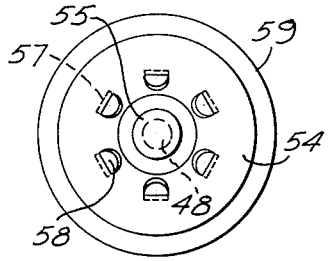
Fig. 11 is an end view taken in the direction of the arrows along the line 11—11 of Fig. 10.

In Figs. 10 and 11, a plunger 48 having the annular enlargement 49 similar to the enlargement 27 and spaced from the lower enlarged end 50 is secured coaxially to an annular backing plate 51 seated around a reduced depending neck 52 of the plunger 48. As illustrated, the annular outer portion of the plate 51 is offset upwardly at 53 from the inner portion. Similarly a lower retainer 54 is seated around the neck 52 and is retained against the plate 51 by a lower integral peened portion 55 of the plunger 48. The outer peripheral portion 56 of the retainer 54 is offset oppositely from the portion 53 to provide a radially outwardly opening channel for a valve disc as described below. An intermediate annular portion of the retainer 54 declines outwardly to the offset portion 56 and is provided with a plurality of circumferentially spaced openings 58 formed by a corresponding plurality of tabs 57 lanced from the retainer 54 and bent upwardly and outwardly as illustrated. The tabs 57 thus comprise a number of annularly arranged seats for the inner circumference of a dished valve disc 59 of the aforesaid molded valve material. The inner circumference of the disc 59 seats snugly against the tabs 57 to prevent radial play therebetween. In the undeformed condition of the disc 59, solid view Fig. 10, the disc inclines radially outwardly, the outer periphery being spaced from the plate portion 53 to enable downward passage of air through the holes 58.

Upon downward movement of the plunger 48, air pressure below the piston, in cooperation with the frictional drag between the depending circumferential lip of the valve disc 59 and the cylinder 20, causes upward movement of the valve disc 59 to the phantom position illustrated in Fig. 10, thereby to effect a fluid tight seal between the valve disc and the offset portion 53. Upon upward movement of the plunger 48, friction between the aforesaid lip and cylinder 20 drags the outer circumferential portion of the valve disc 59 downwardly to enable return of the latter substantially to its aforesaid undeformed condition and to permit downward passage of air through the openings 58 and between the disc 59 and offset portion 53.

In Fig. 10, as also in Figs. 4 and 6 through 9, the circumferential depending lip of the valve member or disc extends radially from the overlying backing plate and engages the cylinder wall of the pump at a location spaced radially from the outer circumference of the corresponding backing plate. Thus the latter is held in central alignment within the cylinder 20 and is prevented from direct contact therewith.

Figure 12:
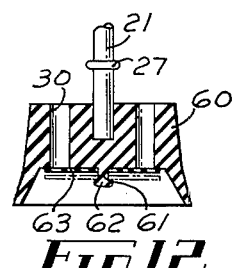
Fig. 12 is a view similar to Fig. 1 illustrating still another modification of the present invention, the valve and plunger assembly being removed from the pump cylinder.

In Fig. 12 the lower end of the plunger 21 extends coaxially into an annular valve disc of the aforesaid molded valve material. In this instance, the body 60 is of appreciable axial thickness to effect the necessary form sustaining rigidity without recourse to an upper backing plate. The body 60 is provided with a plurality of air passages 30 as aforesaid, as well as the circumferential depending cylinder engaging lip. The under portion of the body 60 within the confines of the lip is flat except for a central depending neck 61 which terminates in a lower enlargement 62. A thin diaphragm 63 fitted around the neck 61 is axially slidable thereon and is adapted to close the openings 30 when pressed upward thereagainst by air pressure. Upon downward movement of the plunger 21 in the cylinder 20, the diaphragm 63 is pressed upward in a sealing action against the underside of the body 60 to prevent air passage through the openings 30. Upon upward movement of the plunger 21, the diaphragm 63 slides by gravity to the phantom position illustrated, thereby to enable downward passage of air through the openings 30.

We claim:

1. In a fluid cylinder construction having a thin, flat plunger assembly reciprocal within a cylinder, said plunger assembly comprising a plunger rod, a retainer of rigid material having a central blind socket portion and a backing flange extending radially from said blind socket portion, means in said blind socket portion to receive one end of the plunger rod firmly therein, an annular thin flat valve element of flexible material having an inner circumference anchored solidly against said blind socket portion to prevent radial movement of said thin, flat valve element and movement of said valve element relative to the plunger rod, the outer diameter of said annular thin, flat valve element being larger in diameter than said backing flange, said thin, flat annular valve element frictionally engaging the interior cylinder wall of a cylinder, said valve element having an aperture therethrough at a location between its inner and outer circumference for passage of fluid axially of said cylinder, said backing flange overlying said aperture to block the flow of fluid when said thin, flat valve element engages said backing flange on the working down stroke of the plunger, said thin, flat valve element being flexible at the region of said aperture for movement away from said backing flange on the upstroke of said plunger to enable said flow of fluid therethrough, the plunger assembly engageable with the bottom of said cylinder to effectively exhaust the entire compressed fluid volume from said cylinder.

2. In a thin, flat piston assembly for use in a cylinder of a fluid cylinder construction, the combination of a plunger rod, a flanged member connected with said plunger rod, an annular thin, flat valve element of flexible material, a hub on the flange member, said flexible material engaging said hub on the flanged member to prevent radial movement of said thin, flat valve element and movement of said valve element relative to the plunger rod, the outer periphery of said thin, flat valve element being flexible axially to frictionally engage the inner wall of a cylinder, said cylinder to form a fluid tight seal, said valve element having an aperture therethrough and extending axially of said cylinder for passage of fluid therethrough, said flanged member forming a backing plate overlying said thin, flat valve element in supporting relation thereto and covering said aperture to prevent passage of fluid therethrough when said thin, flat valve element is pressed against said backing flange on the work stroke, and means for holding said plunger and said backing flange against axial and rotational movement relative to said plunger rod so as to eliminate excessive wear and misalignment, the piston assembly engaging the bottom of said cylinder to effectively exhaust the entire compressed fluid volume from said cylinder.

3. In a thin, flat piston and seal assembly mounted on a reciprocal plunger in the cylinder of a fluid cylinder construction, the combination of a plunger, an annular backing flange connected to said plunger, an annular thin, flat resilient valve disc, said thin, flat resilient valve disc having a first opening therein for passage of fluid therethrough and a central opening for securing said thin, flat valve disc to said backing flange, said backing flange forming a backing plate for said thin, flat resilient valve disc while providing a clamping means for anchoring said thin, flat resilient valve disc thereto, said backing flange overlying the first opening in said valve disc, said valve disc in frictional contact with the sidewalls of a cylinder, said thin, flat resilient valve disc permitting the free flow of fluid through said first opening as the plunger is actuated in one direction and said opening being closed as said plunger is moved in the other direction, thereby providing a piston seal structure in a fluid cylinder, the piston and seal assembly being engageable with the bottom of said cylinder to effectively exhaust the entire compressed fluid volume of said cylinder.

4. In a thin, flat piston and seal assembly mounted on a reciprocal plunger in the cylinder of a fluid cylinder construction, the combination of a plunger, an annular backing flange connected to said plunger, an annular thin, flat resilient valve disc, said thin annular flat resilient valve disc having a first opening therein for passage of fluid therethrough and a second central opening for securing said thin, flat resilient valve disc to the backing flange, said backing flange being of less diameter than said flat resilient valve disc, said backing flange overlying the first opening in said valve disc, said valve disc in frictional contact with the sidewall of a cylinder, said flat, resilient valve disc permitting the free flow of fluid through said first opening in one direction as said plunger is actuated upward and blocking said first opening as said plunger is moved downward, the piston and seal assembly engaging the bottom of said cylinder to effectively exhaust the entire compressed fluid volume of said cylinder.

5. In a thin, flat piston and seal assembly mounted on a reciprocal plunger shaft in the cylinder of a fluid cylinder construction, the combination of a plunger rod, a backing flange anchored to said plunger rod, a thin, flat resilient annular valve disc, said thin resilient flat valve disc having a first opening therein for passage of fluid therethrough and a second opening for securing said backing flange to said thin, flat resilient valve disc, said backing flange restraining the movement of said thin, flat resilient valve disc while providing a clamping means for securing said thin, flat resilient valve disc thereto, said backing flange overlying the first opening in said valve disc, said valve disc in frictional contact with the sidewall of a cylinder, said thin, flat resilient valve disc permitting the free flow of fluid through said first opening in one direction as said plunger rod is actuated in one direction and closes said first opening as said valve disc engages the backing plate when the plunger rod is moved in the opposite direction in the pump cylinder, the piston and seal assembly engaging the bottom of said cylinder to effectively exhaust the entire compressed fluid volume of said cylinder.

6. A device as claimed in claim 5 to provide a seal between the upper and lower chambers of the pump cylinder, wherein the backing flange and valve disc form a stop for said plunger rod.

7. In a thin, flat piston and seal assembly mounted on a reciprocable plunger in the cylinder of a pump, the combination of a plunger rod and hollow cylinder, an annular retaining flange connected to said plunger rod, an annular flat, resilient valve disc in frictional contact with the cylinder wall, said flat valve disc having a first opening for passages of fluid therethrough, a second central opening for securing said retainer flange to said flat resilient valve disc, said backing flange overlying the first opening in said valve disc, said retainer flange forming a backing flange for said flat resilient valve disc while providing a clamping means for securing said flat resilient valve disc thereto, said flat resilient valve disc permitting the flow of free fluid through said first opening in one direction as said plunger is actuated said first opening being closed as said plunger is moved in the other direction, thereby providing a fluid tight seal construction, the piston and seal assembly engageable with the bottom end of said cylinder to effectively exhaust the entire compressed fluid volume of said cylinder.

8. In a thin, flat seal and piston assembly mounted on a reciprocable plunger in the cylinder of a pump, the combination of a plunger rod and hollow cylinder, a flange secured to said plunger rod, a central hub on said flange, an annular flat resilient valve disc the circumference of which is in frictional contact with the inside diameter of said cylinder wall, said annular flat resilient valve disc having a first opening therein for passage of fluid therethrough, a second opening centrally positioned in said valve disc for receiving said hub, means for securing said resilient disc to said hub, said backing flange overlying the first opening in said valve disc, said flange being of less diameter than said resilient flat disc, said flat, resilient disc permitting the flow of free fluid through said first opening in one direction as said pump plunger is actuated said first opening being closed to entrap fluid therebeneath as said pump plunger is moved in the opposite direction, the seal and piston assembly engaging the bottom end of said cylinder to effectively exhaust the entire compressed fluid volume of said cylinder.

9. In a thin, flat seal and piston assembly mounted on a reciprocable plunger in a cylinder of a pump, the combination of a plunger rod and hollow cylinder, a flat annular resilient valve disc in frictional engagement with the inside diameter of said cylinder, a retaining flange connected to said plunger, a hub on said flange for retention of said resilient valve disc, said flat resilient valve disc having a first opening therein for passage of fluid therethrough and a second central opening for receiving the hub therethrough the circumference of said resilient valve disc in frictional contact with the inside diameter of said cylinder, said backing flange overlying the first opening in said valve disc, said flat resilient disc movable to permit the flow of free fluid through said first opening in one direction as said plunger is actuated and said first opening closing as said plunger is moved in the other direction.

10. A device as claimed in claim 9 to provide a thin, flat seal between the upper and lower chambers of a pump cylinder, wherein the retainer flange hub forms a stop for said plunger rod in the bottom of a hollow cylinder.

References Cited in the file of this patent

UNITED STATES PATENTS

| | | |
|---|---|---|
| 1,376,863 | Drew | May 3, 1921 |
| 1,414,808 | Fiese | May 2, 1922 |
| 2,164,103 | Baum | June 27, 1939 |
| 2,309,339 | Calaway | June 26, 1943 |
| 2,421,595 | Brown | June 3, 1947 |
| 2,687,845 | Young et al. | Aug. 31, 1954 |

FOREIGN PATENTS

| | | |
|---|---|---|
| 906,408 | Germany | Mar. 15, 1954 |